United States Patent
Zhang et al.

(10) Patent No.: US 10,848,527 B2
(45) Date of Patent: *Nov. 24, 2020

(54) SESSION PROCESSING IN INSTANT MESSAGING

(71) Applicant: DINGTALK HOLDING (CAYMAN) LIMITED, Grand Cayman (KY)

(72) Inventors: Cong Zhang, Hangzhou (CN); Shouchang Wang, Hangzhou (CN); Jing Lin, Hangzhou (CN); Qiongyao Jin, Hangzhou (CN); Cong Yu, Hangzhou (CN); Zijun Lin, Hangzhou (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,072

(22) Filed: May 17, 2019

(65) Prior Publication Data

US 2019/0273766 A1 Sep. 5, 2019

Related U.S. Application Data

(63) Continuation of application No. 15/177,089, filed on Jun. 8, 2016, now Pat. No. 10,348,782.

(51) Int. Cl.
*H04L 29/06* (2006.01)
*H04L 12/26* (2006.01)
(Continued)

(52) U.S. Cl.
CPC .......... *H04L 65/1083* (2013.01); *H04L 43/16* (2013.01); *H04L 51/04* (2013.01);
(Continued)

(58) Field of Classification Search
CPC . H04L 51/04; H04L 61/1594; H04L 65/1083; H04L 65/403; H04L 67/306; H04L 43/16
See application file for complete search history.

(56) References Cited

U.S. PATENT DOCUMENTS

| | | | |
|---|---|---|---|
| 6,026,396 A | 2/2000 | Hall | |
| 2006/0117263 A1* | 6/2006 | Locke | G06Q 10/107 715/751 |

(Continued)

FOREIGN PATENT DOCUMENTS

| | | |
|---|---|---|
| CN | 1835479 A | 9/2006 |
| CN | 101079050 A | 11/2007 |

(Continued)

OTHER PUBLICATIONS

Translation of CN Office Action dated Mar. 16, 2020, from corresponding CN Patent Application No. 201510320276.2, 8 pages.

(Continued)

*Primary Examiner* — Michael C Lai
(74) *Attorney, Agent, or Firm* — Lee & Hayes, P.C.

(57) ABSTRACT

An example method including: with respect to a local session contained in a local session list, determining a remote user account corresponding to the local session; and when it is determined that the remote user account is not included in a set particular account list, concealing the local session in the local session list. Through the above method, it is feasible to only add an account of a particular object to the particular account list. In this way, local sessions corresponding to other remote user accounts other than the account of the particular object will be concealed in the local session list, and thus it is convenient for a local user to look for a particular session.

20 Claims, 10 Drawing Sheets

---

WITH RESPECT TO LOCAL SESSION CONTAINED IN LOCAL SESSION LIST, DETERMINE REMOTE USER ACCOUNT CORRESPONDING TO LOCAL SESSION
701

↓

WHEN DETERMINING THAT REMOTE USER ACCOUNT IS NOT INCLUDED IN SET PARTICULAR ACCOUNT LIST, MOVE LOCAL SESSION DOWN TO BOTTOM OF LOCAL SESSION LIST
702

(51) Int. Cl.
  *H04L 12/58* (2006.01)
  *H04L 29/12* (2006.01)
  *H04L 29/08* (2006.01)

(52) U.S. Cl.
  CPC ........ *H04L 61/1594* (2013.01); *H04L 65/403* (2013.01); *H04L 67/306* (2013.01)

(56) References Cited

U.S. PATENT DOCUMENTS

| | | | | |
|---|---|---|---|---|
| 2006/0167993 | A1* | 7/2006 | Aaron | H04L 51/04 709/204 |
| 2008/0250084 | A1 | 10/2008 | Polimeni | |
| 2009/0055500 | A1* | 2/2009 | Haynes | H04L 12/1827 709/207 |
| 2012/0124147 | A1* | 5/2012 | Hamlin | H04L 51/36 709/206 |
| 2012/0131508 | A1 | 5/2012 | Lee | |
| 2016/0366194 | A1 | 12/2016 | Zhang et al. | |

FOREIGN PATENT DOCUMENTS

| | | |
|---|---|---|
| CN | 103024189 A | 4/2013 |
| CN | 103986829 A | 8/2014 |
| CN | 104205740 A | 12/2014 |
| CN | 104683553 A | 6/2015 |
| CN | 104702782 A | 6/2015 |
| JP | 20144501963 A | 1/2014 |
| JP | 2015015038 A | 1/2015 |
| WO | WO2013116848 A1 | 8/2013 |

OTHER PUBLICATIONS

Translation of CN Office Action dated Aug. 27, 2019, from corresponding CN Patent Application No. 201510320276.2, 7 pages.
Translation of CN Search Report dated Mar. 8, 2020, from corresponding CN Patent Application No. 201510320276.2, 1 page.
Translation of Search Report from corresponding Chinese Patent Application No. 2015103202762, dated Aug. 18, 2019, 1 page.
Japanese Office Action dated Jun. 2, 2020 for Japanese Patent Application No. 2017-563524, a counterpart foreign application of the U.S. Pat. No. 10,348,782, 6 pages.
Translation of Office Action from corresponding Chinese Patent Application No. 2015103202762, dated Mar. 4, 2019, 8 pages.
Translation of Search Report from corresponding Chinese Patent Application No. 2015103202762, dated Feb. 24, 2016, 2 pages.
Office Action for U.S. Appl. No. 15/177,089, dated Jul. 27, 2018, Zhang, "Session Processing in Instant Messaging", 19 pages.
PCT Search Report and Written Opinion dated Sep. 1, 2016 for PCT Application No. PCT/US16/36490, 9 Pages.

* cited by examiner

WITH RESPECT TO LOCAL SESSION CONTAINED IN LOCAL SESSION LIST, DETERMINE REMOTE USER ACCOUNT CORRESPONDING TO LOCAL SESSION
701

WHEN DETERMINING THAT REMOTE USER ACCOUNT IS NOT INCLUDED IN SET PARTICULAR ACCOUNT LIST, MOVE LOCAL SESSION DOWN TO BOTTOM OF LOCAL SESSION LIST
702

FIG. 7

SESSION PROCESSING IN INSTANT MESSAGING

CROSS REFERENCE TO RELATED APPLICATION

The present disclosure is a continuation of and claims priority to U.S. patent application Ser. No. 15/177,089 (which matured into U.S. Pat. No. 10,348,782), filed Jun. 8, 2016, entitled "Session Processing in Instant Messaging," which claims the benefit of Chinese Patent Application Number 201510320276.2 filed Jun. 11, 2015, entitled "Method and Apparatus of Session Processing in Instant Communication" which are hereby incorporated by reference in their entirety.

TECHNICAL FIELD

The present disclosure relates to the field of computer technologies, and, more particularly, to a session processing method and apparatus in instant messaging.

BACKGROUND

At present, Instant Messaging (IM) applications have been widely used in people's life.

In general, after logging in to an IM application through a local user account and a password, a local user may query for stored accounts of other users (hereinafter the other users are referred to as remote users, and the accounts of the other users are referred to as remote user accounts) in an address book of the IM application, or may request a query for remote user accounts from a server. Then, it is feasible to enter a page for conducting instant messaging with the remote users by clicking the queried remote user accounts.

In conventional techniques, the IM application may store all instant messaging messages that have been sent and received between a local user account and each remote user account respectively as one local session corresponding to the each remote user account, and use the local sessions to form a local session list (each local session respectively serves as one line of the local session list) to be displayed in the IM application. It is feasible to, by clicking any local session, open a page that is used when instant messaging is conducted with the corresponding remote user, and then continue to conduct instant messaging with the remote user on the page. As shown in FIG. 1, the left side is a local session list which includes a total of eight local sessions respectively corresponding to remote user accounts 1 to 8, and the right side is a page displayed after a local session corresponding to the remote user account 1 is clicked and opened.

In actual applications, remote users that a local user often contacts in the IM application are usually a few particular objects, such as the spouse, parents, close friends and so on. For most ordinary friends in the address book, the local user may contact them only occasionally. In this case, although a lot of local sessions may be contained in a local session list, what the local user usually clicks are only a few local sessions (hereinafter referred as particular sessions) corresponding to the particular objects. As the particular sessions may be intermingled in a great number of other local sessions in the local session list and positions of the particular sessions in the local session list may also frequently change, it is not convenient for the local user to look for the particular sessions.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide a session processing method in instant messaging, which is used to solve the problem in the conventional techniques that it is not convenient for a local user to look for a particular session in an instant messaging application.

Example embodiments of the present disclosure provide a session processing apparatus in instant messaging, which is used to solve the problem in the conventional techniques that it is not convenient for a local user to look for a particular session in an instant messaging application.

A session processing method in instant messaging provided in the example embodiments of the present disclosure includes:

with respect to a local session contained in a local session list, determining a remote user account corresponding to the local session; and when it is determined that the remote user account is not included in a set particular account list, concealing the local session in the local session list.

A session processing method in instant messaging provided in the example embodiments of the present disclosure includes:

with respect to a local session contained in a local session list, determining a remote user account corresponding to the local session; and when it is determined that the remote user account is not included in a set particular account list, moving the local session down to a bottom of the local session list.

A session processing apparatus in instant messaging provided in the example embodiments of the present disclosure includes:

a determination module that, with respect to a local session contained in a local session list, determines a remote user account corresponding to the local session; and a concealing module that, when it is determined that the remote user account is not included in a set particular account list, conceals the local session in the local session list.

A session processing apparatus in instant messaging provided in the example embodiments of the present disclosure includes:

a determination module that, with respect to a local session contained in a local session list, determines a remote user account corresponding to the local session; and a bottoming module that, when it is determined that the remote user account is not included in a set particular account list, moves the local session down to a bottom of the local session list.

According to the example embodiments of the present disclosure, through at least one of the above technical solutions, it is feasible to only add an account of a particular object to the particular account list. In this way, local sessions corresponding to other remote user accounts other than the account of the particular object will be concealed in the local session list, or will be moved down to the bottom of the local session list, and thus it is convenient for a local user to look for a particular session.

BRIEF DESCRIPTION OF THE DRAWINGS

The accompanying drawings described herein are used to provide a further understanding about the present disclosure and constitute a part of the present disclosure, and the example embodiments of the present disclosure and description thereof are used to illustrate the present disclosure, and do not constitute improper limitations to the present disclosure. In the accompanying drawings.

FIG. 7 is another example session processing process in instant messaging according to an example embodiment of the present disclosure;

DETAILED DESCRIPTION

To make the objectives, technical solutions and advantages of the present disclosure clearer, the technical solutions of the present disclosure are described below with reference to specific example embodiments and corresponding accompanying drawings. Evidently, the example embodiments described only represent some example embodiments and not all of the example embodiments of the present disclosure. Based on the example embodiments in the present disclosure, all other example embodiments obtained by those of ordinary skill in the art without making creative efforts all belong to the protection scope of the present disclosure.

Figure 2:
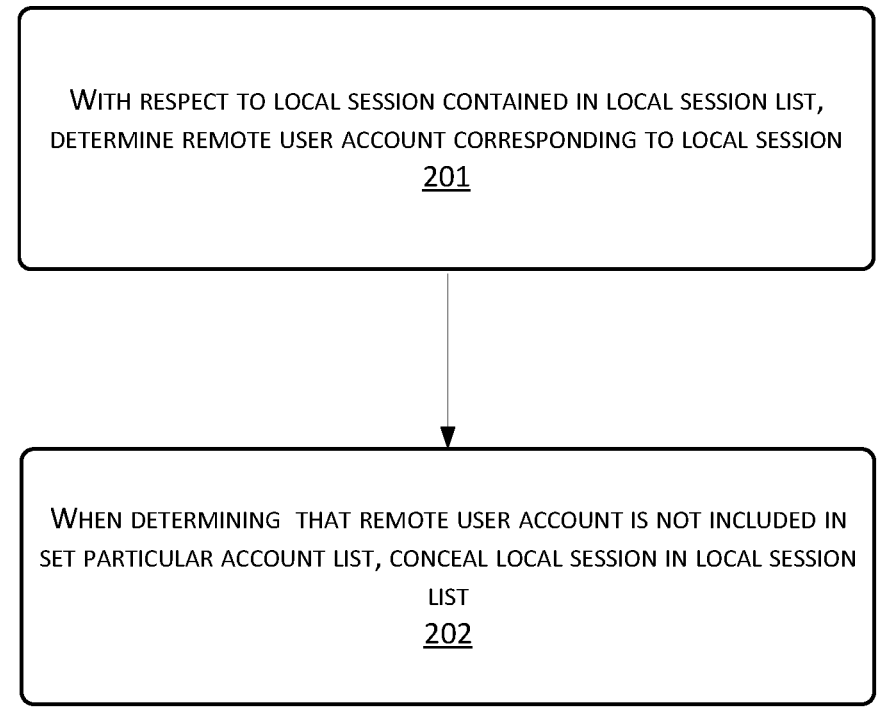
FIG. 2 is an example session processing process in instant messaging according to an example embodiment of the present disclosure.

FIG. 2 is a session processing process in instant messaging according to an example embodiment of the present disclosure, which specifically includes the following steps:

S201: With respect to a local session contained in a local session list, a remote user account corresponding to the local session is determined.

An execution body of a method for information authentication according to an example embodiment of the present disclosure may be: a terminal, a server, an application having an instant messaging function on the terminal or the server, and so on. The terminal may include, but is not limited to, a mobile phone, a tablet computer, a smart watch, a personal computer, a vehicle-mounted mobile station and the like. The server may include, but is not limited to, a personal computer, a large/medium-sized computer, a computer cluster and the like. The execution body described herein does not constitute a limitation to the present disclosure.

In the example embodiment of the present disclosure, after a local user account is logged in, it is feasible to view and operate a local session list. Each local session contained in the local session list respectively corresponds to one remote user account. The remote user account may be an account of a single user, and may also be a group account formed by accounts of at least two users (for example, an account of a user group, an account of a discussion group, and so on).

When the remote user account is an account of a single user, a local session corresponding to the remote user account may include all instant messaging messages that have been sent and received between the account of the single user and the local user account; when the remote user account is a group account, a local session corresponding to the remote user account may include all instant messaging messages which are sent and received between accounts of all users in the group account in the group.

In general, when a local session is generated and saved, it is feasible to label the local session, or add other additional information thereto, to represent a remote user account corresponding to the local session. Alternatively, it is also feasible to establish a mapping between the local session and a remote user account corresponding to the local session, which is to be added to a pre-established mapping table.

In this way, in step S201, it is feasible to determine a remote user account corresponding to the local session by querying for the label, the additional information, or the mapping table, and then it is easy to perform particular processing on the local session corresponding to any of the remote user accounts.

S202: When it is determined that the remote user account is not included in a set particular account list, the local session in the local session list is concealed.

In the example embodiment of the present disclosure, it is feasible to add, by a local user, a selected remote user account to a set particular account list. A specific operating method of the adding includes, but is not limited to, the following two kinds:

A first kind is that one or more remote user accounts are selected from respective remote user accounts contained in an address book and added to the set particular account list.

A second kind is that a remote user account is queried from a server and the queried remote user account is added to the set particular account list.

Certainly, it is also feasible to remove a remote user account that has been contained in the set particular account list.

In the example embodiment of the present disclosure, to solve the problems in the conventional techniques, it is feasible to only add, in advance, remote user accounts of a few particular objects that a local user often contacts to a set particular account list (for example, a friend list or the like). In this way, although a local session list, in addition to possibly including local sessions (that is, particular sessions) corresponding to the remote user accounts of the particular objects, may also include a great number of local sessions corresponding to remote user accounts of ordinary friends that the local user contacts occasionally. As the remote user accounts of the ordinary friends are not contained in the set particular account list, it is feasible to conceal the local sessions (which may also be referred to as sessions to be concealed) corresponding to the remote user accounts of the ordinary friends, and in this way, operation convenience is improved when the local user frequently looks for a particular session.

It should be noted that the concealing described in the example embodiment of the present disclosure may refer to making a certain object completely invisible in a certain region, or may also refer to making a certain object non-obvious (inconspicuous or not easy to be found) in a certain region with respect to other objects in the region.

In an actual application, for any session to be concealed, it is feasible to conceal the session to be concealed in different implementation manners. The implementation manner includes, but is not limited to, the following two manners:

The first one is that the session to be concealed is set to be completely invisible in the local session list. For example, the session to be concealed is not displayed at all, and any tip about the session to be concealed is not provided.

Figure 1:
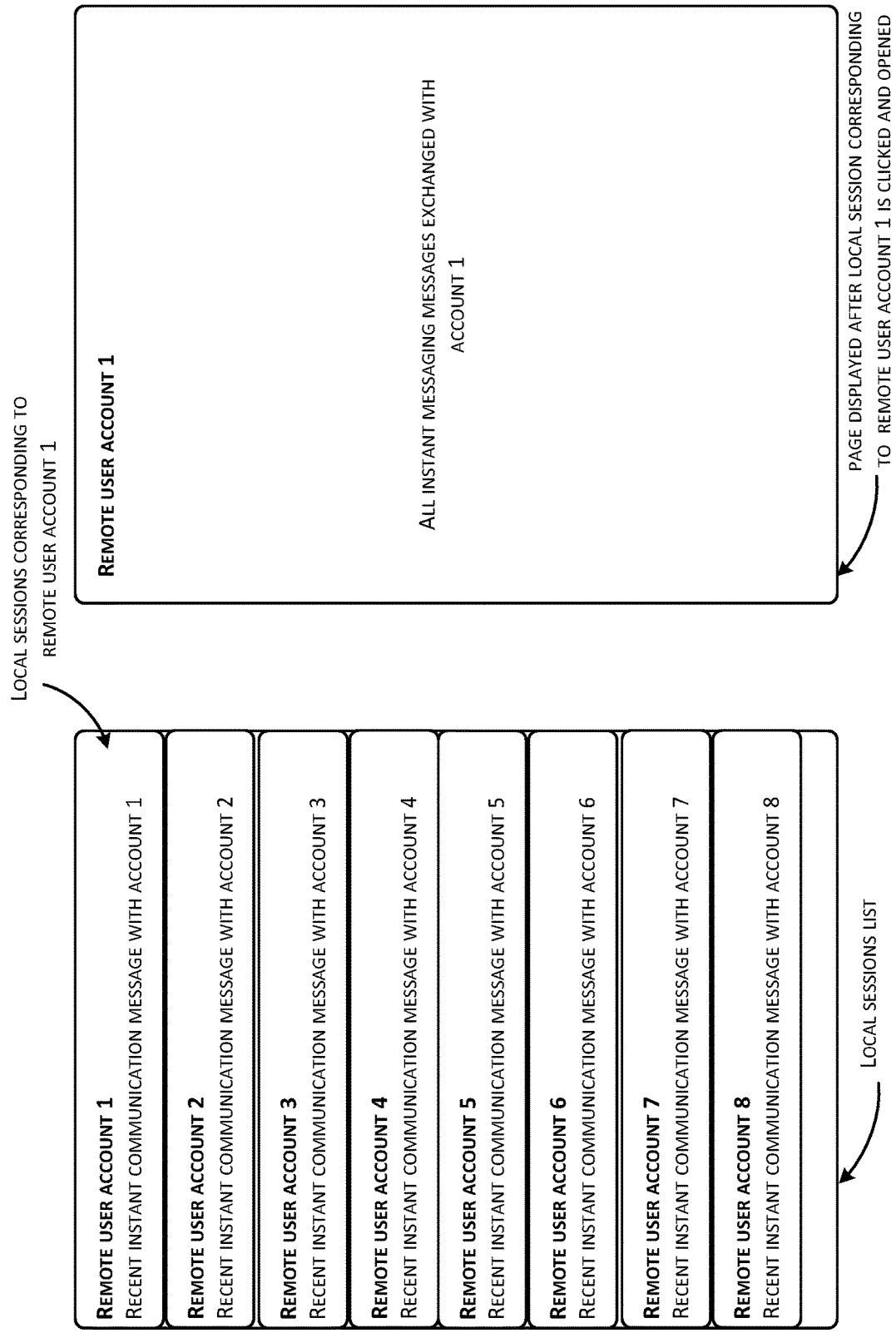
FIG. 1 is a schematic diagram of display of a local session list in instant messaging in an actual application scenario provided in the conventional techniques.
Figure 3:
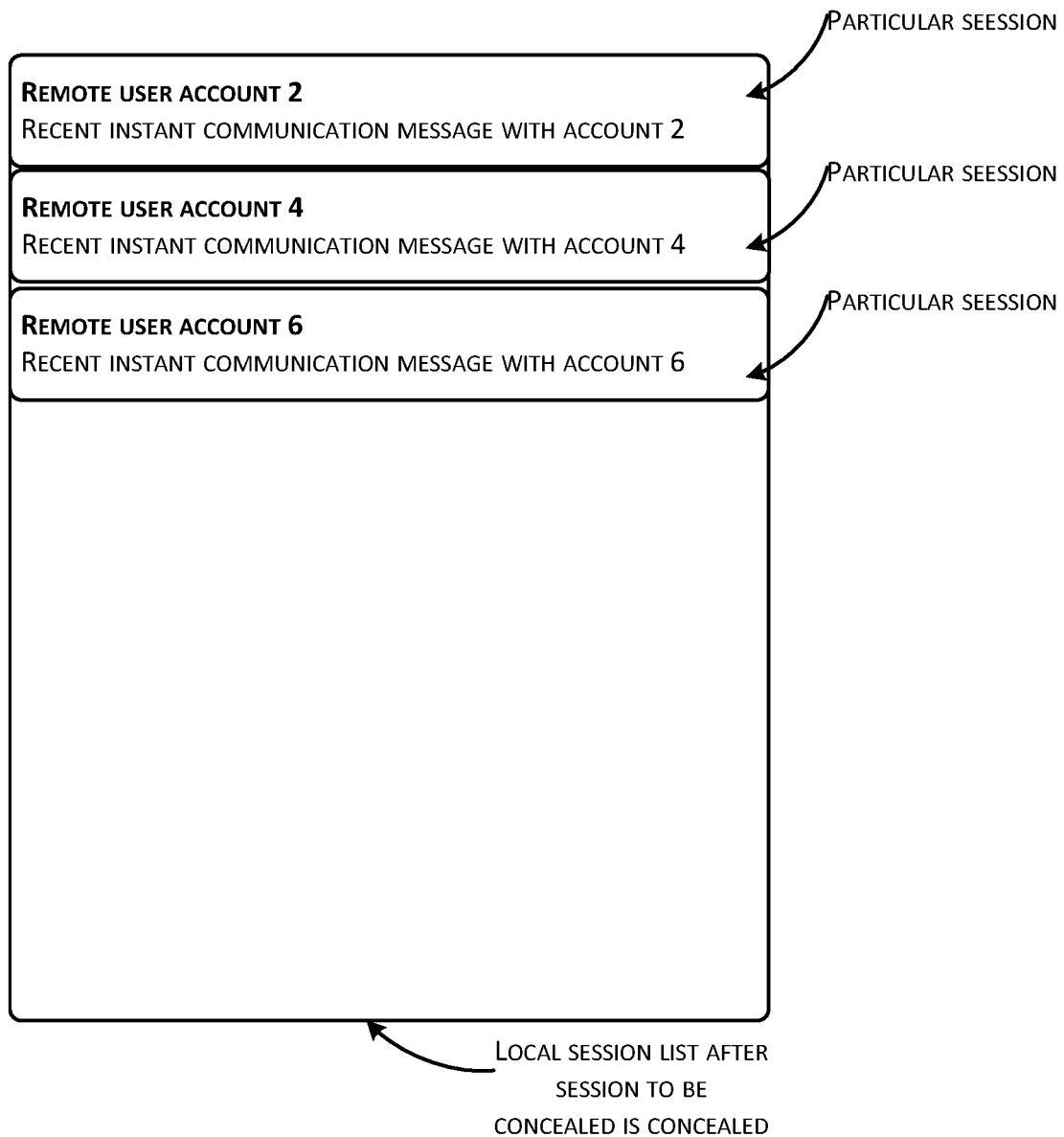
FIG. 3 is an example schematic diagram of a local session list that is displayed after a session to be concealed is set to be completely invisible and concealed in the local session list according to an example embodiment of the present disclosure.

Using the accounts in FIG. 1 as an example, assuming that three accounts, e.g., the remote user account 2, the remote user account 4 and the remote user account 6, are accounts of the particular object and have been added to the set particular account list, sessions corresponding to the three accounts are all particular sessions. Correspondingly, all five accounts, e.g., the remote user account 1, the remote user account 3, the remote user account 5, the remote user account 7 and the remote user account 8, are not contained in the set particular account list, and sessions corresponding to the five accounts are all sessions to be concealed. FIG. 3 shows a schematic diagram of a local session list after a session to be concealed is concealed in the local session list in a manner that the session to be concealed is set to be completely invisible. The five sessions to be concealed have all been completely invisible.

Alternatively, the session to be concealed is set to be partially invisible in the local session list. For example, the session to be concealed is folded, or the session to be concealed is indented to a sidebar of a current display screen, and so on, and a corresponding tip is provided. Respective local sessions in the local session list which are located below the session to be concealed are all moved one column up, to ensure visual continuity of content contained in the local session list. That is, respective local sessions visible for the local user in the local session list are still arranged and displayed continuously in sequence from the first column of the local session list.

Figure 4:
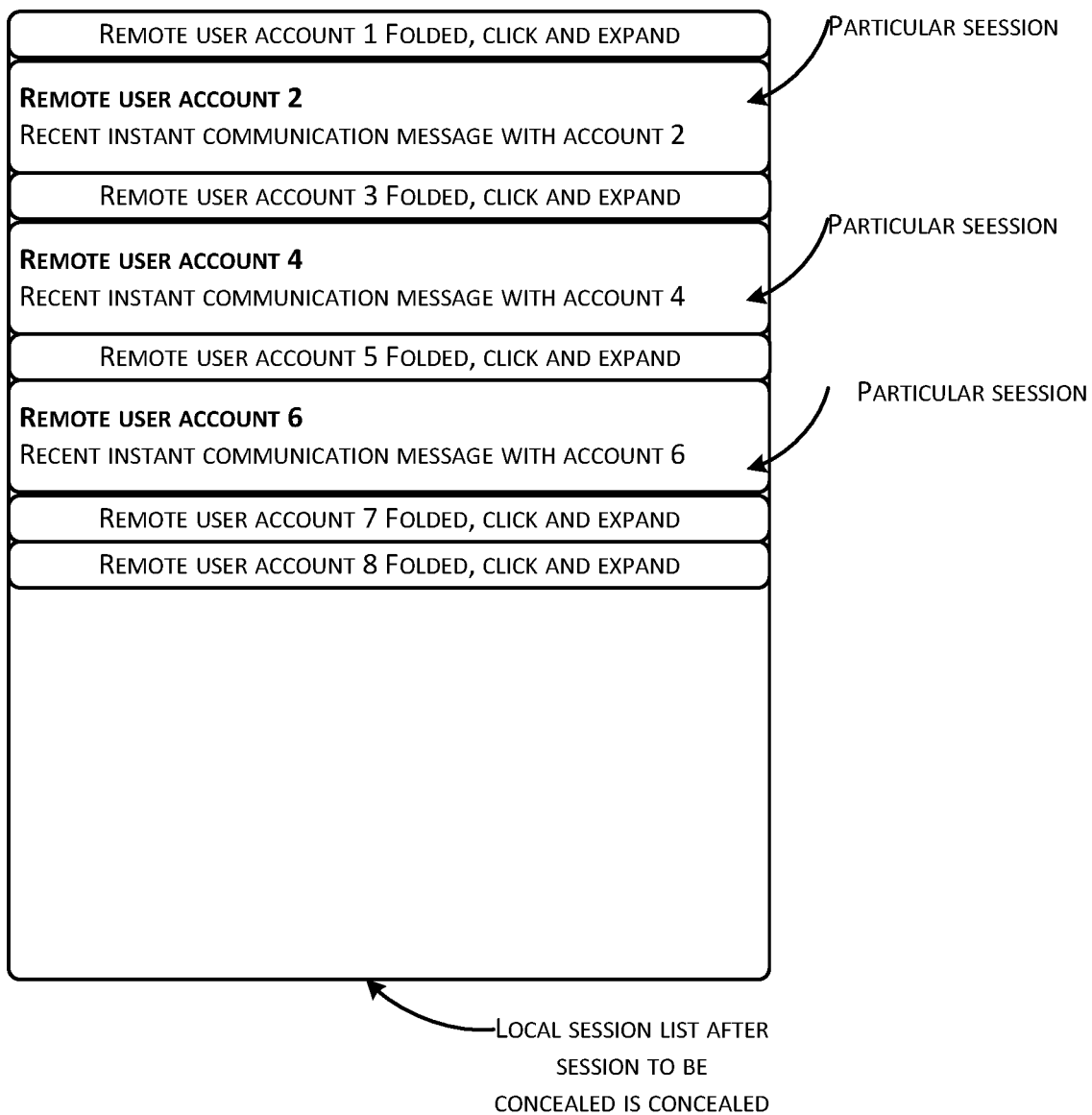
FIG. 4 is an example schematic diagram of a local session list that is displayed after a session to be concealed is concealed in the local session list in a manner that the session to be concealed is folded, according to an example embodiment of the present disclosure.

Another example of the first concealing manner is described by continuously using the supposition in FIG. 3. FIG. 4 shows a schematic diagram of a local session list after a session to be concealed is concealed in the local session list in a manner that the session to be concealed is folded. FIG. 4 shows that the five sessions to be concealed have all been folded, are partially invisible and have corresponding operation tips.

The second one is to, by respectively adjusting brightness, contrast, color and other parameters when the session to be concealed and other local sessions are displayed currently, make the displayed session to be concealed after adjustment non-obvious with respect to the other local sessions. For example, a display color of the session to be concealed is adjusted to a very light color within preset thresholds (for example, light grey, faint yellow, and so on).

Figure 5:
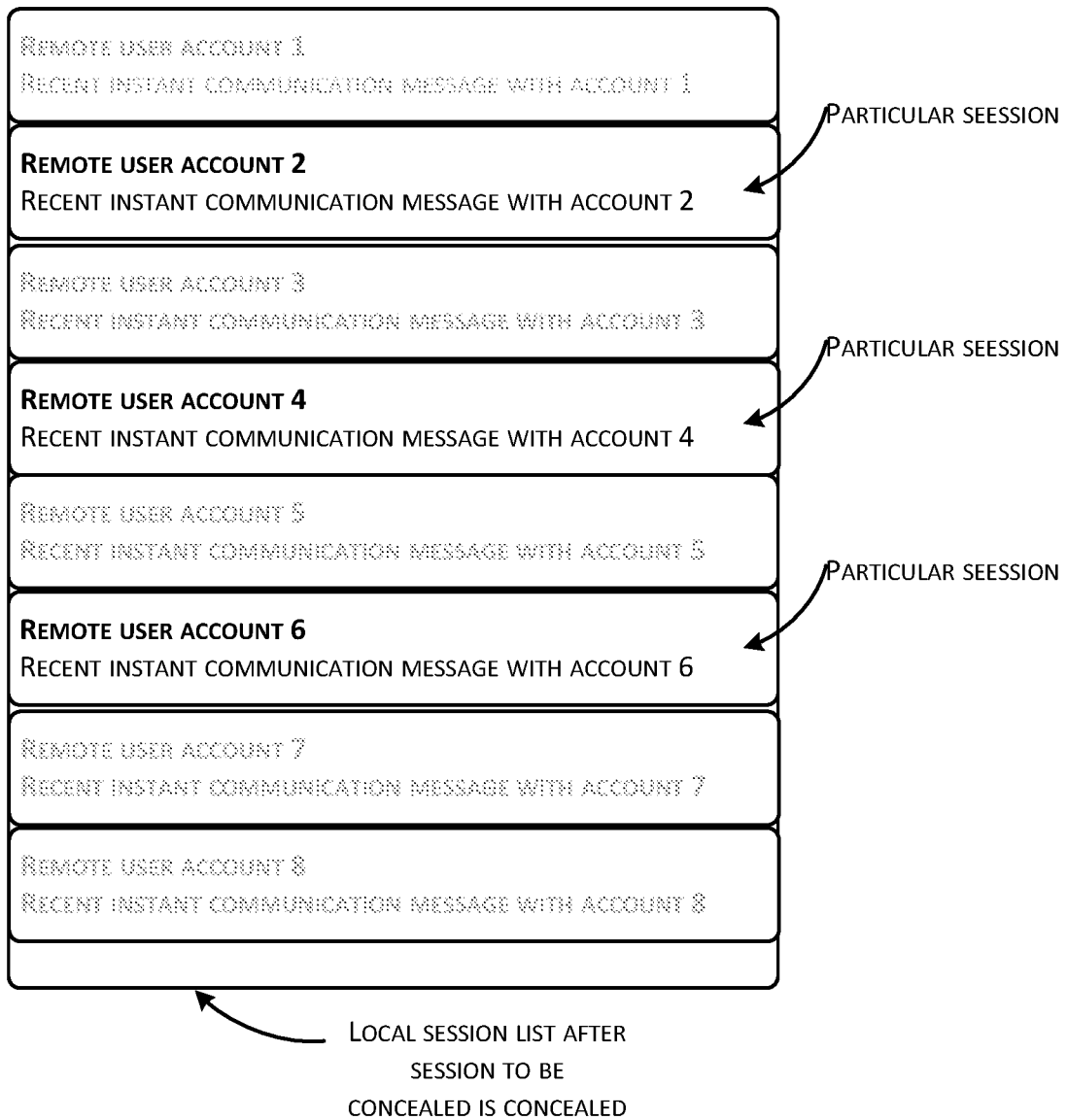
FIG. 5 is an example schematic diagram of a local session list that is displayed after a session to be concealed is concealed in the local session list in a manner that a color parameter for displaying the session to be concealed is adjusted, according to an example embodiment of the present disclosure.

One example of the second concealing manner is described by continuously using the supposition in FIG. 3. FIG. 5 shows a schematic diagram of a local session list after a session to be concealed is concealed in the local session list in a manner that a color parameter for displaying the session to be concealed is adjusted. FIG. 5 shows that display colors of the five sessions to be concealed have all been adjusted to light grey and are very inconspicuous compared with the display color of the particular session.

Through the above method, as local sessions corresponding to other remote user accounts other than the account of the particular object will be concealed in the local session list, it is convenient for the local user to look for a particular session.

Further, in an actual application, regarding step S202 as above, when it is determined that the remote user account is not included in a set particular account list, it is likely that the local user is using a local session corresponding to the remote user account (i.e., is conducting instant messaging with the remote user account in the local session), and the current local user may frequently click the local session. In this case, if the local session is immediately concealed in the local session list, the convenience for the local user to click the local session will be affected.

To solve this problem, regarding step S202 as above, before the local session is concealed in the local session list, the local session is monitored to determine whether or not, in a set time interval, there is a new instant messaging message added to the local session. If yes, the local user is considered as using the local session currently, and the local session in the local session list is temporarily not concealed in the local session list. If not, the local user is considered as not using the local session currently, and thus the local session in the local session list is concealed immediately.

Further, the set time interval is described, and an implementation method of setting the time interval includes, but is not limited to, the following two kinds:

The first one is to set one time interval respectively for each local session, wherein the length of the time interval may be a suitable preset value (for example, it may be 24 h, or 12 h, or 1 h, or the like), and the interval starting point of the time interval may be: a time point represented by a timestamp of a most recent instant messaging message contained in the local session. Correspondingly, the interval end point of the time interval may be: a time point after a period of time of which the length is a preset value elapses from the interval starting point.

When the local session is monitored, a monitoring timer is set. Each time a new instant messaging message is added to the local session, the monitoring timer is reset and timing is restarted once, and when the timing length of one-time timing of the monitoring timer reaches the length of the time interval, the local session in the local session list is immediately concealed.

The second one is to set a global time interval for each of the local sessions. For example, the same monitoring timer is used to monitor all the local sessions. The monitoring timer times circularly, with the timing length of each round being the length of the global time interval, and in each round of cycle, if it is monitored that there is no new instant messaging message added to the local session, the local session in the local session list is immediately cancelled.

In the example embodiment of the present disclosure, regarding step S202 as above, after the local session is concealed in the local session list, it is still likely that the remote user account corresponding to the local session sends an instant messaging message over, and in this case, the local user may need to use the local session once again, to view the instant messaging message or reply the instant messaging message.

In this case, if the local session is still in a concealed state in the local session list, it is evidently not convenient for the user to use; therefore, regarding step S202 as above, after the local session is concealed in the local session list, when it is determined that there is a new instant messaging message added to the local session, the local session in the local session list is redisplayed. It should be noted that the present disclosure does not limit the display position where the local session is redisplayed, it is feasible to display the local session on the top of the local session list (for example, the first column), it is also feasible to display the local session in a position where the local session is located before concealed, and so on. In addition, if the local session was previously concealed by adjusting brightness, contrast, color and other parameters, the parameters are restored to values prior to adjustment, so that the local session may be redisplayed.

Further, regarding step S202 as above, after the local session is concealed in the local session list, it is also likely that the local user sends an instant messaging message to the remote user account corresponding to the local session. In this case, the local user may also need to use the local session once again, and thus it is necessary to provide a corresponding method for using the local session once again that has been concealed in the local session list.

When the local session is in a completely invisible state in the local session list, it is feasible to use the local session through an address book on the premise that the remote user account corresponding to the local session is contained in the address book. For example, it is feasible to, by performing a particular operation (such as, clicking or sliding the remote user account contained in the address book, and so on), send a session view instruction for the remote user account contained in the address book to the execution body in the example embodiment of the present disclosure. Correspondingly, when receiving the session view instruction, the execution body may open and display the local session, and then the user may use the local session once again.

Figure 6:
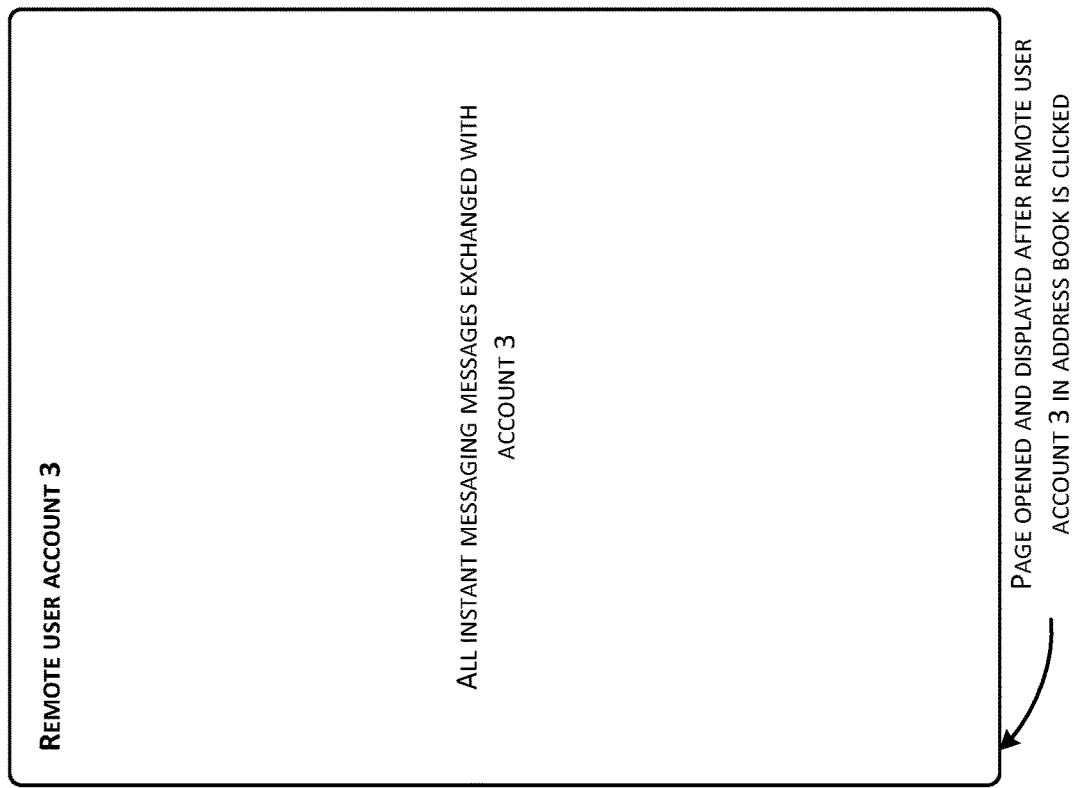
FIG. 6 is an example schematic diagram of opening and displaying a local session that has been concealed in a local session list based on an address book according to an example embodiment of the present disclosure.
Figure 6:

The address book is described by continuously using the assumption in FIG. 3. The left side of FIG. 6 is a schematic diagram of an address book, and the right side of FIG. 6 is a local session corresponding to the remote user account 3 opened and displayed after the remote user account 3 in the address book is clicked.

The example embodiment of the present disclosure, in addition to providing the method in FIG. 2, also provides another session processing method in instant messaging, which may also solve the problem raised in the conventional techniques. FIG. 7 illustrates another session processing process in instant messaging, which may include the following steps:

S701: With respect to a local session contained in a local session list, a remote user account corresponding to the local session is determined.

S702: When it is determined that the remote user account is not included in a set particular account list, the local session is moved down to the bottom of the local session list.

It should be noted that the bottom of the local session list may refer to the last line of the local session list, or may also refer to any line below a particular session in the lowest position in the local session list.

Figure 8:
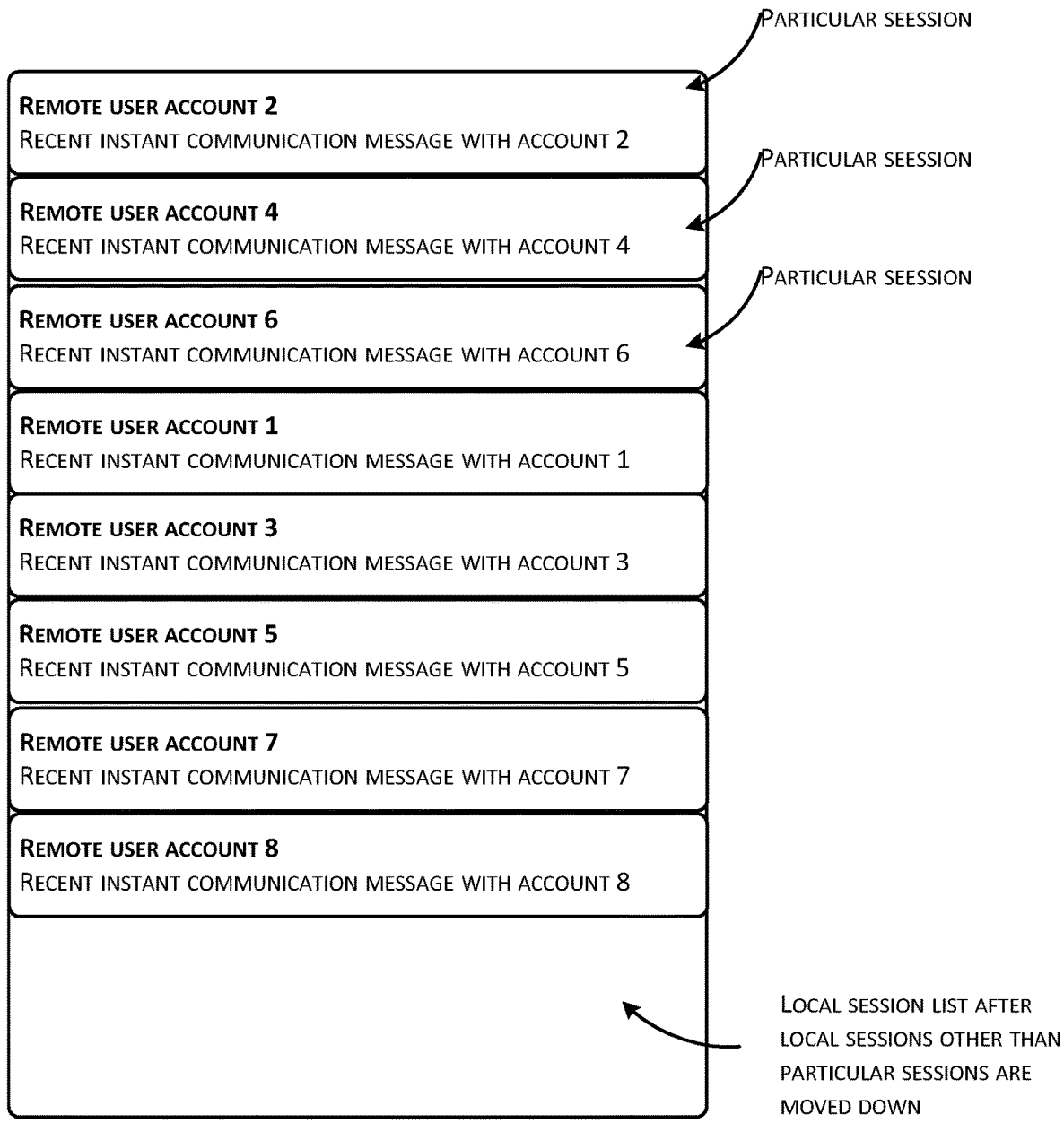
FIG. 8 is an example schematic diagram of a processed local session list in an actual application scenario corresponding to FIG. 7 according to an example embodiment of the present disclosure.

Continuing to use the assumption in FIG. 3; FIG. 8 is a schematic diagram of a local session list after local sessions corresponding to the five accounts, the remote user account 1, the remote user account 3, the remote user account 5, the remote user account 7 and the remote user account 8, are processed with the method of FIG. 7. Ash shown, the local sessions corresponding to the five accounts have all been moved down to the bottom of the local session list.

Through the above method, it is feasible to only add an account of a particular object to the particular account list. In this way, as local sessions corresponding to other remote user accounts other than the account of the particular object will be moved down to the bottom of the local session list, the local user may find a particular session only by directly viewing the first few columns of the local session list, and thus the convenience when the local user looks for a particular session is improved.

Further, similar to the method in FIG. 2, regarding step S702 as above, before the local session is moved down to the bottom of the local session list, in some examples, it is also necessary to determine that, in a set time interval, there is no new instant messaging message added to the local session.

Furthermore, corresponding to the step of redisplaying the concealed local session in FIG. 2, the practice in FIG. 7 may be: after the local session is moved down to the bottom of the local session list, when it is determined that there is a new instant messaging message added to the local session, the local session is moved up to the top of the local session list, wherein the top of the local session list could be the first line of the local session list.

In the example embodiment of the present disclosure, the particular account list may be manually maintained on the execution body by the local user, or may also be automatically or semi-automatically maintained by the execution body.

Regarding the former maintenance manner, for example, the local user may send a particular account determination instruction for at least one remote user account to the execution body by operating a particular control. When receiving the particular account determination instruction, the execution body may add the at least one remote user account to the particular account list.

Regarding the latter maintenance manner, for example, the execution body may, with respect to a remote user account that has not yet contained in the particular user account list, determine periodically or in real time whether or not, in a local session corresponding to the remote user account, an average exchange frequency at which instant messaging messages are exchanged between the remote user account and a local user account is greater than a preset threshold. If yes, the local user account is considered as having frequently exchanged instant messaging messages with the remote user account in a recent period of time and is very likely to continue exchanging instant messaging messages with the remote user account frequently, and thus the remote user account is added to the particular account list, to facilitate the local user to view the local session corresponding to the remote user account.

It should be noted that the average exchange frequency may refer to the number of times an instant messaging message is exchanged between the remote user account and the local user account in unit time (for example, in a recent week, or in a recent month, or the like). That the remote user account and the local user account respectively send to the other side an instant messaging message may be referred to as: an instant messaging message is exchanged once between the remote user account and the local user account. For example, suppose that the selected unit time is a recent week and there is a total of 100 instant messaging messages added to the local session in the recent week, wherein 55 instant messaging messages are sent by the local user account and 45 instant messaging messages are sent by the remote user account, the average exchange frequency may be denoted as 45 times.

Certainly, in an actual application, before adding the remote user account to the particular account list, the execution body may further inquire of the local user about whether to execute the adding operation or not. If the local user determines to execute the adding operation, the execution body adds the remote user account to the particular account list. If the local user determines not to execute the adding operation, the execution body does not add the remote user account to the particular account list. As a result, it is feasible to avoid that the execution body goes against real intention of the local user when maintaining the particular account list, thereby improving reliability of the particular account list.

Figure 9:
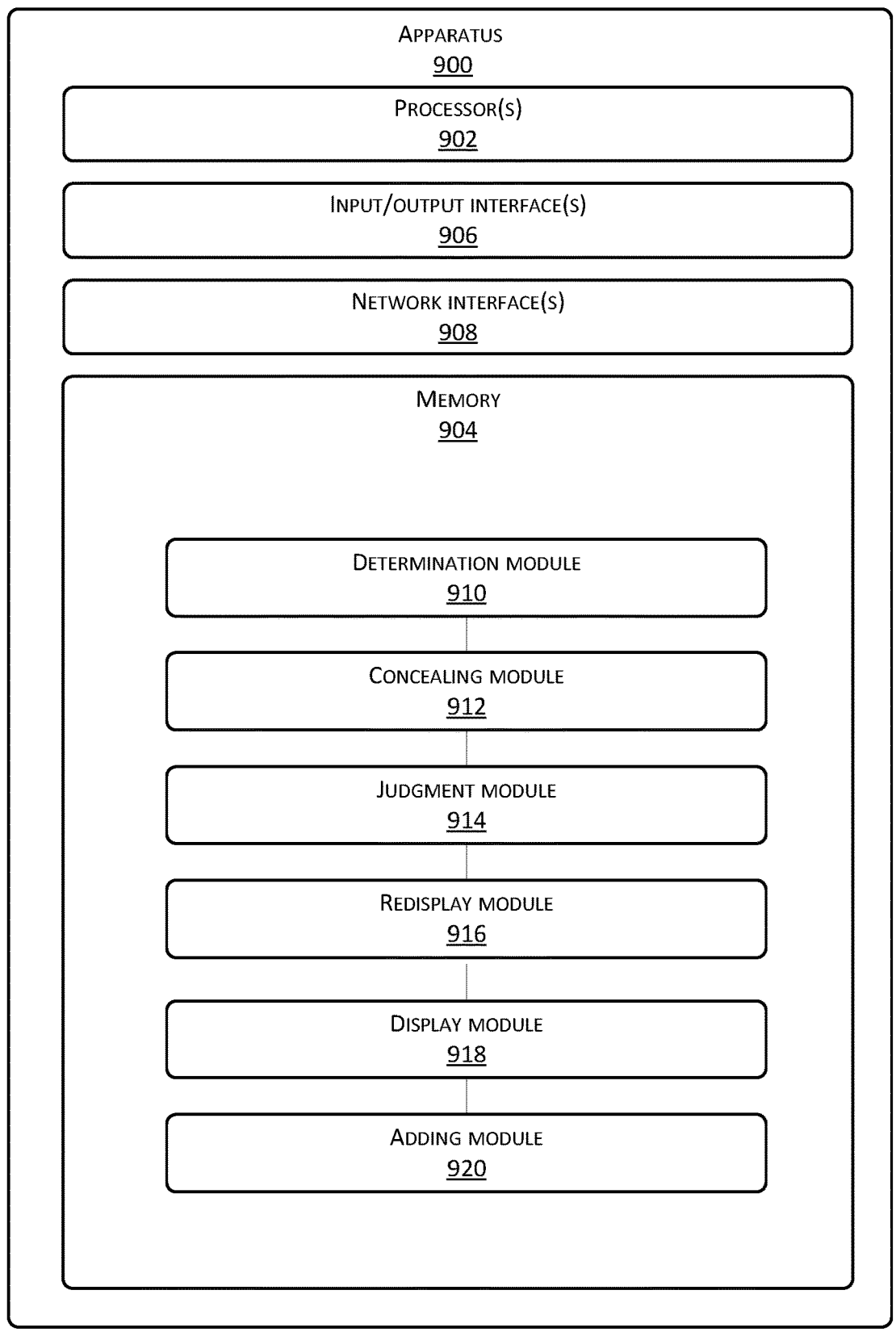
FIG. 9 is an example schematic structural diagram of a session processing apparatus in instant messaging corresponding to FIG. 2 according to an example embodiment of the present disclosure.
Figure 10:
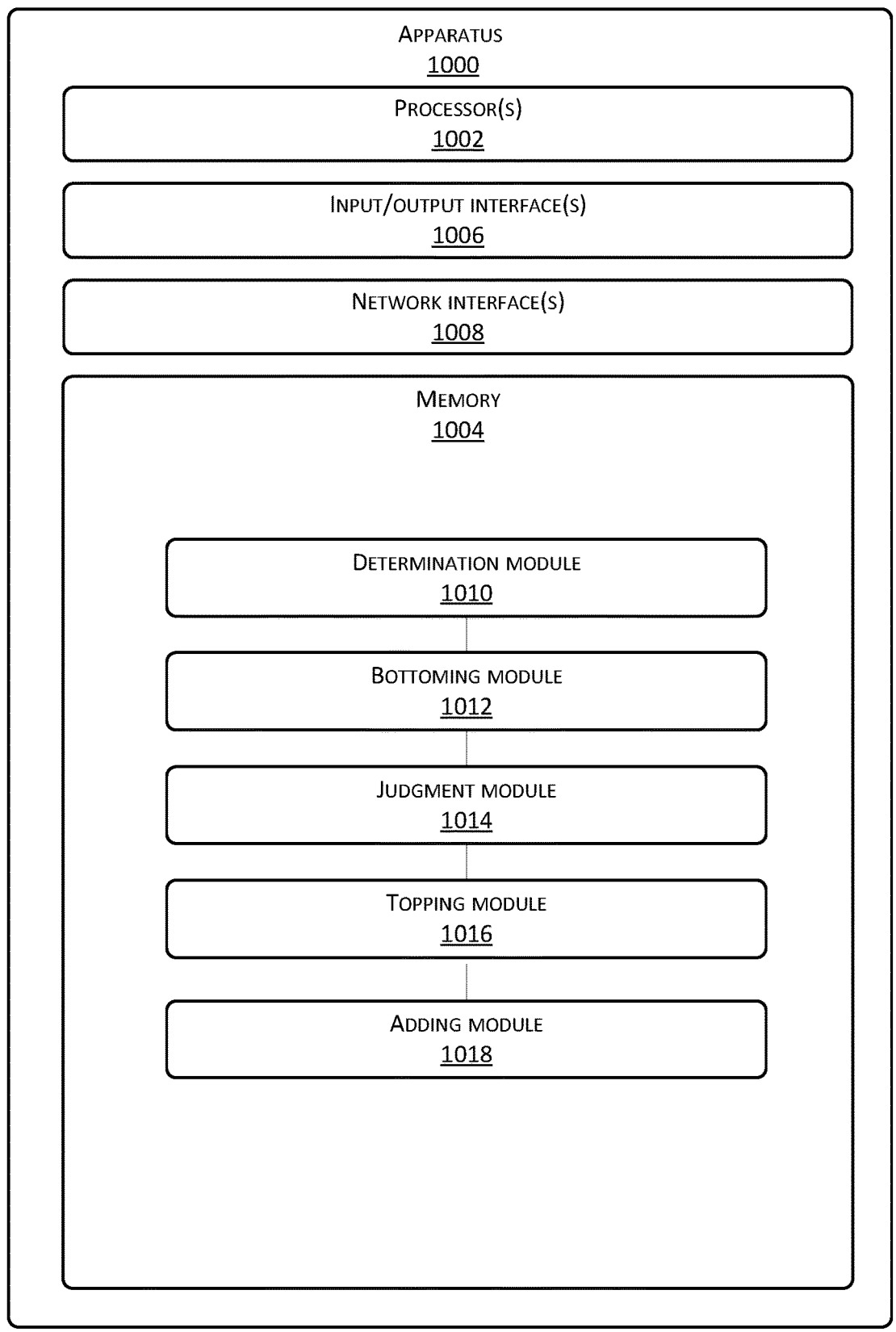
FIG. 10 is an example schematic structural diagram of a session processing apparatus in instant messaging corresponding to FIG. 7 according to an example embodiment of the present disclosure.

The above relates to the session processing methods in instant messaging according to the example embodiments of the present disclosure, and based on the same thought, the example embodiments of the present disclosure further provide corresponding session processing apparatuses in instant messaging, as shown in FIG. 9 and FIG. 10.

FIG. 9 is a schematic structural diagram of a session processing apparatus 900 in instant messaging corresponding to FIG. 2 according to an example embodiment of the present disclosure. The apparatus 900 includes one or more processor(s) 902 or data processing unit(s) and memory 904. The apparatus 900 may further include one or more input/output interface(s) 906, and network interface(s) 908. The memory 904 is an example of computer readable media.

The memory 904 may store therein a plurality of modules or units including:

a determination module 910 that, with respect to a local session contained in a local session list, determines a remote user account corresponding to the local session; and a concealing module 912 that, when it is determined that the remote user account is not included in a set particular account list, conceals the local session in the local session list.

The apparatus 900 may further include the following modules stored on memory 904:

a judgment module 914 that, before the concealing module 912 conceals the local session in the local session list, determines that, in a set time interval, there is no new instant messaging message added to the local session; and a redisplay module 916 that, after the concealing module 912 conceals the local session in the local session list, when it is determined that there is a new instant messaging message added to the local session, redisplays the local session in the local session list.

The remote user account is contained in an address book. The apparatus 900 may further include the following module stored on memory 904: a display module 918 that, when a session view instruction for the remote user account contained in the address book is received, opens and displays the local session.

The apparatus 900 may further include the following module stored on memory 904: an adding module 920 that, when it is determined that, in the local session, an average exchange frequency at which instant messaging messages are exchanged between the remote user account and a local user account is greater than a preset threshold, adds the remote user account to the particular account list; and/or when a particular account determination instruction for at least one remote user account is received, adds the at least one remote user account to the particular account list.

For example, the apparatus as shown in FIG. 9 may be located on a terminal, a server or on an application having an instant messaging function on the terminal or the server.

FIG. 10 is a schematic structural diagram of a session processing apparatus 1000 in instant messaging corresponding to FIG. 7 according to an example embodiment of the present disclosure.

The apparatus 1000 includes one or more processor(s) 1002 or data processing unit(s) and memory 1004. The apparatus 1000 may further include one or more input/output interface(s) 1006, and network interface(s) 1008. The memory 1004 is an example of computer readable media.

The memory 1004 may store therein a plurality of modules or units including:

a determination module 1010 that, with respect to a local session contained in a local session list, determines a remote user account corresponding to the local session; and a bottoming module 1012 that, when it is determined that the remote user account is not included in a set particular account list, moves the local session down to the bottom of the local session list.

The apparatus 1000 may further include the following modules stored on memory 1004:

a judgment module 1014 that, before the bottoming module 1012 moves the local session down to the bottom of the local session list, determines that, in a set time interval, there is no new instant messaging message added to the local session; and a topping module 1016 that, after the bottoming module 1012 moves the local session down to the bottom of the local session list, when it is determined that there is a new instant messaging message added to the local session, moves the local session up to the top of the local session list.

The bottom of the local session list may, for example, include: the last line of the local session list, or any line below a local session which is in the lowest position in local sessions corresponding to respective remote user accounts contained in the set particular account list in the local session list.

The apparatus 1000 may further include the following module stored on memory 1004:

an adding module 1018 that, when it is determined that, in the local session, an average exchange frequency at which instant messaging messages are exchanged between the remote user account and a local user account is greater than a preset threshold, adds the remote user account to the particular account list; and/or when a particular account determination instruction for at least one remote user account is received, adds the at least one remote user account to the particular account list.

For example, the apparatus 1000 as shown in FIG. 10 may be located on a terminal, a server or on an application having an instant messaging function on the terminal or the server.

The example embodiments of the present disclosure provide at least one session processing method and apparatus in instant messaging, wherein the method includes: with respect to a local session contained in a local session list, determining a remote user account corresponding to the local session; and when it is determined that the remote user account is not included in a set particular account list, concealing the local session in the local session list. Alternatively, the method includes: with respect to a local session contained in a local session list, determining a remote user account corresponding to the local session; and when it is determined that the remote user account is not included in a set particular account list, moving the local session down to the bottom of the local session list. Through the above method, it is feasible to only add an account of a particular object to the particular account list. In this way, local sessions corresponding to other remote user accounts other than the account of the particular object will be concealed in the local session list, or will be moved down to the bottom of the local session list, and thus it is convenient for a local user to look for a particular session.

As will be appreciated by those skilled in the art, the example embodiments of the present invention may be provided as a method, a system, or a computer program product. Accordingly, the present invention may use the form of an entire hardware example embodiment, an entire software example embodiment or an example embodiment combining software and hardware aspects. Furthermore, the present invention may use the form of a computer program product implemented on one or more computer-available storage media (including, but not limited to, magnetic disk memories, CD-ROMs, optical memories, and the like) including computer-available program codes.

The present disclosure is described with reference to flow charts and/or block diagrams of the method, device (system) and computer program product according to the example embodiments of the present invention. It should be understood that computer program instructions may be used to implement each flow and/or block in the flow charts and/or block diagrams as well as a combination of flows and/or blocks in the flow charts and/or block diagrams. These computer program instructions may be provided to a general-purpose computer, a special-purpose computer, an embedded processor or a processor of other programmable data processing devices to generate a machine, so that an apparatus configured to implement functions specified in one or more flows in the flow charts and/or one or more blocks in the block diagrams is generated by using instructions executed by a computer or a processor of other programmable data processing devices.

These computer program instructions may also be stored in a computer readable memory that may guide a computer or other programmable data processing devices to work in a particular manner, so that the instructions stored in the computer readable memory generate an article of manufacture including an instruction apparatus, where the instruction apparatus implements functions specified in one or more flows in the flow charts and/or one or more blocks in the block diagrams.

These computer program instructions may also be loaded into a computer or other programmable data processing devices, so that a series of operation steps are performed on the computer or other programmable devices to generate processing implemented by the computer, and instructions executed on the computer or other programmable devices provide steps for implementing functions specified in one or more flows in the flow charts and/or one or more blocks in the block diagrams.

In a typical configuration, a computation device includes one or more central processing units (CPUs), an input/output interface, a network interface and a memory.

The memory may include the following forms of a computer readable medium: a volatile memory, a random access memory (RAM) and/or a non-volatile memory, for example, a read-only memory (ROM) or a flash RAM. The memory is an example of the computer readable medium.

The computer readable medium includes volatile and non-volatile, removable and non-removable media, and may use any method or technology to store information. The information may be a computer readable instruction, a data structure, a module of a program or other data. Examples of storage medium of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which may be that storing computer accessible information. According to the definition herein, the computer readable medium does not include transitory media, for example, a modulated data signal and a carrier.

It should be further noted that terms "comprise", "include" or any other variations thereof are intended to cover non-exclusive inclusion, so that processes, methods, goods or devices that include a series of elements not only include those elements, but also include other elements not explicitly listed, or further include elements inherent in the processes, methods, goods or devices. Without more restrictions, an element defined by the wording of "including a . . . " does not preclude the further inclusion of other identical elements in the processes, methods, goods or devices that include the element.

As will be appreciated by those skilled in the art, the example embodiments of the present disclosure may be provided as a method, a system, or a computer program product. Accordingly, the present disclosure may take the form of an entire hardware example embodiment, an entire software example embodiment or an example embodiment combining software and hardware aspects. Furthermore, the present disclosure may take the form of a computer program product implemented on one or more computer-available storage media (including, but not limited to, magnetic disk memories, CD-ROMs, optical memories, and the like) including computer-available program codes.

The above are only example embodiments of the present disclosure and should not be used to limit the present disclosure. For those skilled in the art, the present disclosure may have various variations and changes. Any modification, equivalent replacement, improvement and the like made within the spirit and principle of the present disclosure shall fall within the scope of the claims of the present disclosure.

What is claimed is:

1. A method comprising:
 improving operation convenience in instant messaging by:
  adding a remote user account to a set particular account list, in response to determining that, in a local session, an average exchange frequency at which instant messaging messages are exchanged between the remote user account and a local user account is greater than a preset threshold;

determining whether the remote user account is included in the set particular account list, the remote user account corresponding to the local session contained in a local session list;

determining that, in a set time interval, there is no new instant messaging message added to the local session; and concealing the local session in the local session list in response to determining that the remote user account is not included in the set particular account list, wherein concealing the local session in the local session list comprises moving the local session down to the bottom of the local session list, wherein the bottom of the local session list includes a last line of the local session list.

2. The method of claim 1, further comprising:
after the moving the local session down to the bottom of the local session list, moving the local session up in the local session list in response to determining that there is a new instant messaging message added to the local session.

3. The method of claim 2, wherein moving the local session up in the local session list includes moving the local session up to the top of the local session list.

4. The method of claim 1, further comprising:
after the concealing the local session in the local session list, displaying the local session in the local session list in response to determining that there is a new instant messaging message added to the local session.

5. The method of claim 1, wherein the remote user account is contained in an address book.

6. The method of claim 5, further comprising opening and displaying the local session when a session view instruction for the remote user account contained in the address book is received.

7. An apparatus, comprising:
One or more processors,
memory, coupled to the one or more processors, the memory storing thereon computer-readable instructions executable by one or more processors, that when executed by the one or more processors, causes the one or more processors to perform acts including:
improving operation convenience in instant messaging by:
adding a remote user account to a set particular account list, in response to determining that, in a local session, an average exchange frequency at which instant messaging messages are exchanged between the remote user account and a local user account is greater than a preset threshold;
determining whether the remote user account is included in the set particular account list, the remote user account corresponding to the local session contained in a local session list;
determining that, in a set time interval, there is no new instant messaging message added to the local session; and
concealing the local session in the local session list in response to determining that the remote user account is not included in the set particular account list, wherein concealing the local session in the local session list comprises moving the local session down to the bottom of the local session list, wherein the bottom of the local session list includes a line below a respective local session which is in a lowest position in local sessions, corresponding to respective remote user accounts contained in the set particular account list, in the local session list.

8. The apparatus of claim 7, the acts further comprising:
after the moving the local session down to the bottom of the local session list, moving the local session up in the local session list in response to determining that there is a new instant messaging message added to the local session.

9. The apparatus of claim 8, wherein moving the local session up in the local session list includes moving the local session up to the top of the local session list.

10. The apparatus of claim 7, the acts further comprising:
after the concealing the local session in the local session list, displaying the local session in the local session list in response to determining that there is a new instant messaging message added to the local session.

11. The apparatus of claim 7, wherein the remote user account is contained in an address book.

12. The apparatus of claim 11, the acts further comprising opening and displaying the local session when a session view instruction for the remote user account contained in the address book is received.

13. A computer-readable storage medium storing computer-readable instructions executable by one or more processors, that when executed by the one or more processors, causes the one or more processors to perform acts comprising:
improving operation convenience in instant messaging by:
adding a remote user account to a particular account list when receiving the particular account determination instruction for the remote user account;
determining whether the remote user account is included in the set particular account list, the remote user account corresponding to the local session contained in a local session list;
determining that, in a set time interval, there is no new instant messaging message added to the local session; and
concealing the local session in the local session list in response to determining that the remote user account is not included in the set particular account list, wherein concealing the local session in the local session list comprises moving the local session down to the bottom of the local session list.

14. The computer-readable storage medium of claim 13, wherein the bottom of the local session list includes a last line of the local session list.

15. The computer-readable storage medium of claim 13, wherein the bottom of the local session list includes a line below a respective local session which is in a lowest position in local sessions, corresponding to respective remote user accounts contained in the set particular account list, in the local session list.

16. The computer-readable storage medium of claim 13, the acts further comprising:
after the moving the local session down to the bottom of the local session list, moving the local session up in the local session list in response to determining that there is a new instant messaging message added to the local session.

17. The computer-readable storage medium of claim 16, wherein moving the local session up in the local session list includes moving the local session up to the top of the local session list.

18. The computer-readable storage medium of claim 13, the acts further comprising:
   after the concealing the local session in the local session list, displaying the local session in the local session list in response to determining that there is a new instant messaging message added to the local session.

19. The computer-readable storage medium of claim 13, wherein the remote user account is contained in an address book.

20. The computer-readable storage medium of claim 19, the acts further comprising opening and displaying the local session when a session view instruction for the remote user account contained in the address book is received.

\* \* \* \* \*